United States Patent
Ichimoto et al.

(10) Patent No.: US 7,150,254 B2
(45) Date of Patent: Dec. 19, 2006

(54) AUTO START-STOP DEVICE FOR INTERNAL COMBUSTION ENGINE AND MOTOR VEHICLE EQUIPPED WITH AUTO START-STOP DEVICE

(75) Inventors: Kazuhiro Ichimoto, Nisshin (JP); Osamu Harada, Toyota (JP); Yukio Kobayashi, Kasugai (JP); Katsuhiko Yamaguchi, Nisshin (JP); Daigo Ando, Nisshin (JP); Takahiro Nishigaki, Nagoya (JP); Ikuo Ando, Aichi-ken (JP); Keiko Hasegawa, Toyota (JP); Mamoru Tomatsuri, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 107 days.

(21) Appl. No.: 11/108,859

(22) Filed: Apr. 19, 2005

(65) Prior Publication Data
US 2005/0229890 A1 Oct. 20, 2005

(30) Foreign Application Priority Data
Apr. 20, 2004 (JP) ............................. 2004-124210

(51) Int. Cl.
*F02N 17/00* (2006.01)
(52) U.S. Cl. ................ 123/179.4; 123/179.16
(58) Field of Classification Search ............. 123/179.4, 123/179.16
See application file for complete search history.

(56) References Cited

U.S. PATENT DOCUMENTS

| 5,632,238 A * | 5/1997 | Furukawa et al. | 123/179.4 |
| 6,807,476 B1 * | 10/2004 | Ando et al. | 123/179.4 |
| 6,817,330 B1 * | 11/2004 | Ogawa et al. | 123/179.4 |
| 6,947,827 B1 * | 9/2005 | Fuse et al. | 123/179.4 |

FOREIGN PATENT DOCUMENTS

| JP | 08-098319 | 4/1996 |
| JP | 2000-120455 | 4/2000 |
| JP | 2002-339781 | 11/2002 |

* cited by examiner

*Primary Examiner*—Stephen K. Cronin
*Assistant Examiner*—Arnold Castro
(74) *Attorney, Agent, or Firm*—Kenyon & Kenyon LLP

(57) ABSTRACT

The auto engine start control of the invention regulates a throttle valve to a restricted opening to reduce an air intake flow at an ordinary start of an engine (step S140). When the driver stamps on an accelerator pedal to raise an engine power demand Pe* to or above a preset threshold value Pref, the auto engine start control regulates the throttle valve to a standard opening to ensure the air intake flow corresponding to the engine power demand Pe* (step S150) and thereby cranks the engine. This arrangement desirably dampens potential vibration induced by ignition at the ordinary start of the engine, while ensuring prompt output of the required driving force from the engine under the condition of the higher engine power demand Pe*.

10 Claims, 6 Drawing Sheets

AUTO START-STOP DEVICE FOR INTERNAL COMBUSTION ENGINE AND MOTOR VEHICLE EQUIPPED WITH AUTO START-STOP DEVICE

BACKGROUND OF THE INVENTION

1. Field of the Invention

The present invention relates to an auto start-stop device for an internal combustion engine and a motor vehicle equipped with the auto start-stop device. More specifically the invention pertains to an auto start-stop device for an internal combustion engine that outputs power to a drive shaft. The auto start-stop device automatically stops the internal combustion engine under a preset stop condition, while restarting the automatically stopped internal combustion engine under a preset start condition. The invention also pertains to a motor vehicle equipped with such an auto start-stop device for an internal combustion engine.

2. Description of the Prior Art

A proposed vehicle start system cranks an engine at a start and regulates an operation timing of an air intake valve to minimize the time of developing the negative pressure of the air intake valve to a preset level (see Japanese Patent Laid-Open Gazette No. 2000-120455). This proposed vehicle start system minimizes the time of developing the negative pressure of the air intake valve to the level of explosive combustion and thereby shortens a total time required for the engine start. Combustion at the sufficient level of the negative pressure of the air intake valve is expected to prevent potential vibrations induced by non-explosive combustion and to ensure a quiet start.

SUMMARY OF THE INVENTION

The prior art vehicle start system shortens the time of developing the negative pressure of the air intake valve to the level of explosive combustion for the engine start but does not take into account potential shocks at the engine start. One possible measure lessens the air intake flow at the engine start to reduce the quantity of ignition energy and thereby prevent potential shocks induced by ignition at the engine start. The lessened air intake flow certainly prevents the potential shocks induced by ignition, but undesirably interferes with prompt output of the required driving force.

The auto start-stop device for an internal combustion engine of the invention and the motor vehicle equipped with the auto start-stop device thus aim to dampen potential vibration at a start of the internal combustion engine and to ensure prompt output of a power demand required by the driver.

In order to attain at least part of the above and the other related objects, the present invention is directed to an auto start-stop device for an internal combustion engine and a motor vehicle equipped with the auto start-stop device, which have the configurations discussed below.

The present invention is directed to an auto start-stop device for an internal combustion engine that outputs power to a drive shaft, the auto start-stop device automatically stopping the internal combustion engine under a preset stop condition, while restarting the automatically stopped internal combustion engine under a preset start condition, and the auto start-stop device includes: an air intake flow regulation module that regulates an air intake flow to the internal combustion engine; a power demand setting module that sets a power demand to be output from the internal combustion engine in response to an operator's operation; and a start-time air intake flow control module that controls the air intake flow regulation module under the preset start condition to start the internal combustion engine with a less air intake flow to the internal combustion engine when the set power demand is lower than a preset reference level, while controlling the air intake flow regulation module under the preset start condition to start the internal combustion engine with a greater air intake flow to the internal combustion engine when the set power demand is not lower than the preset reference level.

The auto start-stop device for the internal combustion engine of the invention controls the air intake flow regulation module to start the internal combustion engine with the less air intake flow to the internal combustion engine when the set power demand is lower than the preset reference level, while controlling the air intake flow regulation module to start the internal combustion engine with the greater air intake flow to the internal combustion engine when the set power demand is not lower than the preset reference level. This arrangement desirably dampens potential vibration induced by ignition at a start of the internal combustion engine. The structure of the invention also enables the internal combustion engine to be promptly started and output a required power, in response to the driver's demand of high driving force.

In the auto start-stop device for the internal combustion engine of the invention, the start-time air intake flow control module may control the air intake flow regulation module to start the internal combustion engine with a varying air intake flow, which increases with an increase in power demand above the preset reference level. Further, the start-time air intake flow control module may also control the air intake flow regulation module to regulate the air intake flow synchronously with a start of ignition control of the internal combustion engine. Furthermore, the start-time air intake flow control module may control the air intake flow regulation module to regulate the air intake flow synchronously with a start of fuel injection control of the internal combustion engine.

The present invention is directed to a motor vehicle that includes: an internal combustion engine that outputs power to a drive shaft linked with an axle; an auto start-stop module that automatically stops the internal combustion engine under a preset stop condition, while restarting the automatically stopped internal combustion engine under a preset start condition; an air intake flow regulation module that regulates an air intake flow to the internal combustion engine; a power demand setting module that sets a power demand to be output from the internal combustion engine in response to an operator's operation; and a start-time air intake flow control module that controls the air intake flow regulation module under the preset start condition to start the internal combustion engine with a less air intake flow to the internal combustion engine when the set power demand is lower than a preset reference level, while controlling the air intake flow regulation module under the preset start condition to start the internal combustion engine with a greater air intake flow to the internal combustion engine when the set power demand is not lower than the preset reference level.

The motor vehicle of the invention controls the air intake flow regulation module to start the internal combustion engine with the less air intake flow to the internal combustion engine when the set power demand is lower than the preset reference level, while controlling the air intake flow regulation module to start the internal combustion engine with the greater air intake flow to the internal combustion engine when the set power demand is not lower than the preset reference level. This arrangement desirably dampens potential vibration induced by ignition at a start of the internal combustion engine. The structure of the invention also enables the internal combustion engine to be promptly started and output a required power, in response to the driver's demand of high driving force.

In the motor vehicle of the invention, the start-time air intake flow control module may control the air intake flow regulation module to start the internal combustion engine with a varying air intake flow, which increases with an increase in power demand above the preset reference level. Also, the start-time air intake flow control module may control the air intake flow regulation module to regulate the air intake flow synchronously with a start of ignition control of the internal combustion engine. Further, the start-time air intake flow control module may control the air intake flow regulation module to regulate the air intake flow synchronously with a start of fuel injection control of the internal combustion engine.

The motor vehicle of the invention may further be equipped with a motor that outputs power to the axle. In one preferable embodiment, the motor vehicle of this structure has: a driving force demand setting module that sets a driving force demand to be output to the drive shaft, in response to the operator's operation; and a driving force control module that controls the internal combustion engine and the motor to output a driving force equivalent to the driving force demand to the drive shaft. This arrangement ensures output of required power corresponding to the driving force demand to the drive shaft, in response to the operator's operation.

DESCRIPTION OF THE PREFERRED EMBODIMENTS

Figure 1:
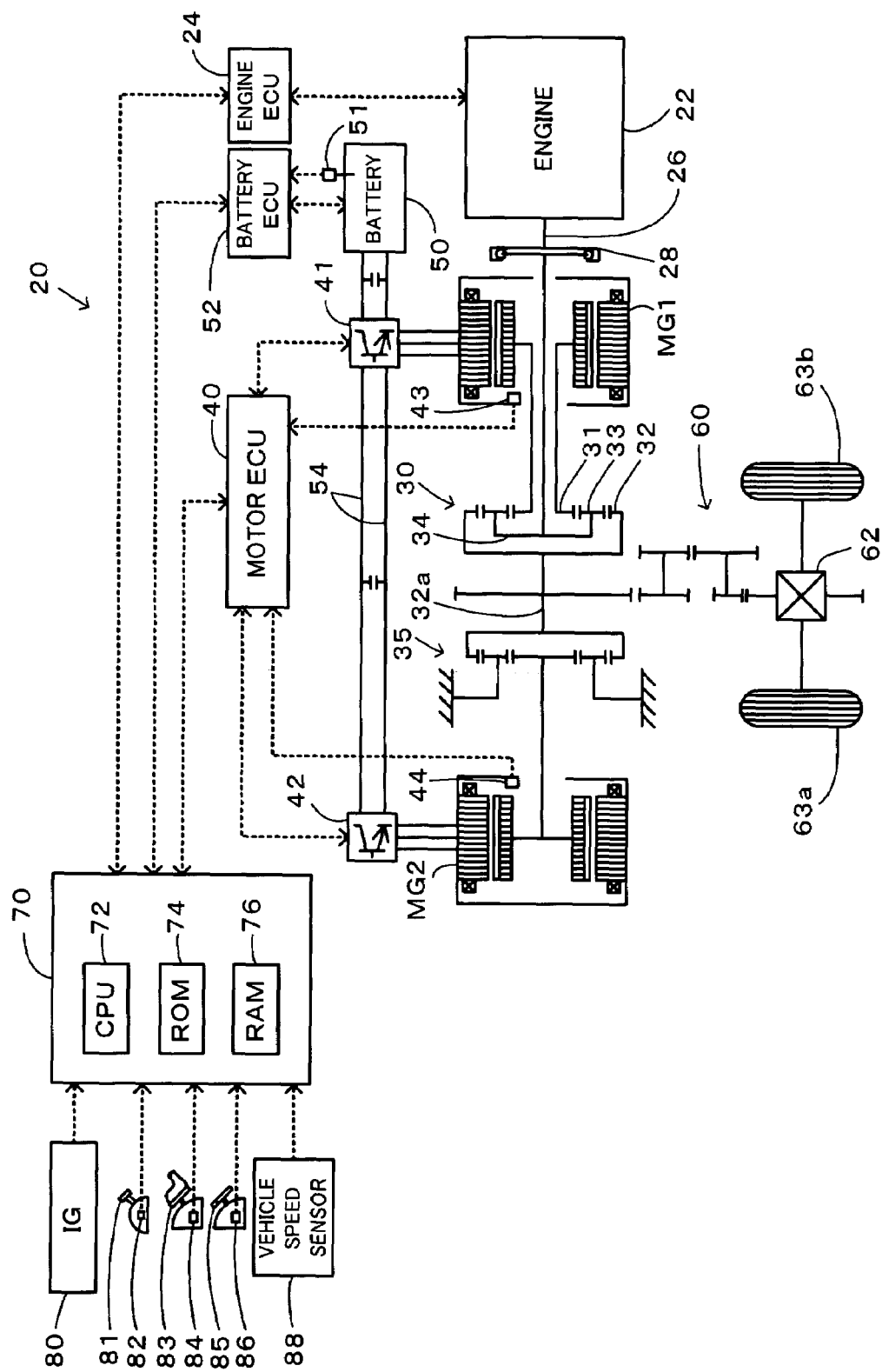
FIG. 1 schematically illustrates the configuration of a hybrid vehicle with an auto start-stop device for an internal combustion engine in one embodiment of the invention.

One mode of carrying out the invention is discussed below as a preferred embodiment. FIG. 1 schematically illustrates the configuration of a hybrid vehicle 20 equipped with an auto start-stop device for an internal combustion engine in one embodiment of the invention. As illustrated, the hybrid vehicle 20 of the embodiment includes an engine 22, a three shaft-type power distribution integration mechanism 30 that is linked to a crankshaft 26 or an output shaft of the engine 22 via a damper 28, a motor MG1 that is linked to the power distribution integration mechanism 30 and is capable of generating electric power, a reduction gear 35 that is attached to a ring gear shaft 32a or a drive shaft linked to the power distribution integration mechanism 30, a motor MG2 that is connected with the reduction gear 35, and a hybrid electronic control unit 70 that controls the respective constituents of the hybrid vehicle 20.

Figure 2:
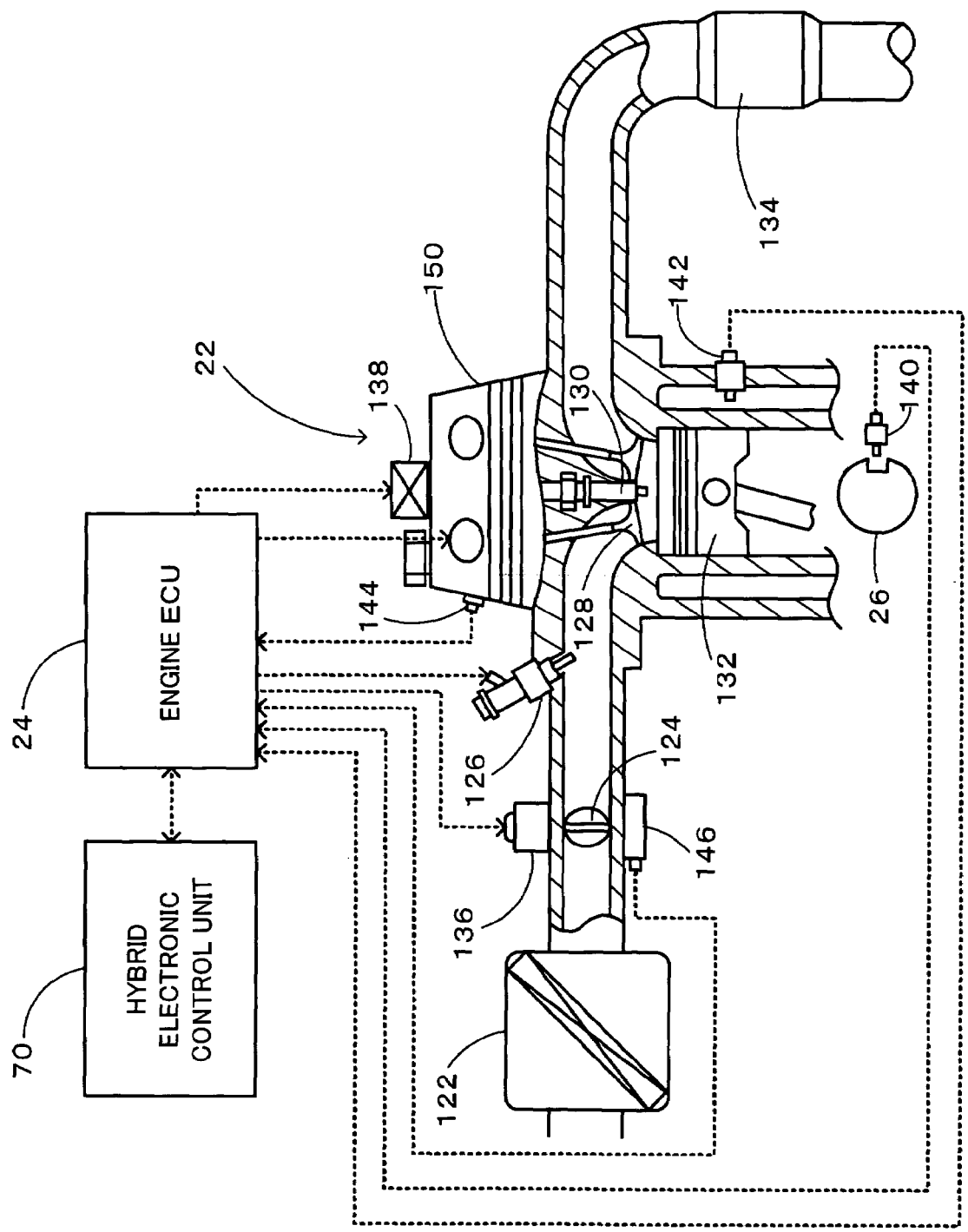
FIG. 2 schematically illustrates the structure of the engine.

The engine 22 is an internal combustion engine that consumes a hydrocarbon fuel, such as gasoline or light oil, to output power. As shown in FIG. 2, the engine 22 receives a supply of the air cleaned by an air cleaner 122 and ingested via a throttle valve 124, while receiving a supply of gasoline injected by a fuel injection valve 126. The supplies of the air and gasoline are mixed to an air-fuel mixture, which is introduced into a combustion chamber via an intake valve 128 and is ignited for explosive combustion with an electric spark of an ignition plug 130. Reciprocating motions of a piston 132 by means of energy of the explosive combustion are converted into rotations of the crankshaft 26. The exhaust gas from the engine 22 goes through a catalytic converter (three-way catalyst) 134 for removal of toxic components contained in the exhaust gas, that is, carbon monoxide (CO), hydrocarbons (HC), and nitrogen oxides (NOx), and is discharged to the outside air.

The engine 22 is under control of an engine electronic control unit (hereafter referred to as engine ECU) 24. The engine ECU 24 inputs signals representing the present conditions of the engine 22 from various sensors via its input port (not shown). For example, the engine ECU 24 receives, via its input port, a crank position or a rotational position of the crankshaft 26 from a crank position sensor 140, a cooling water temperature of the engine 22 from a water temperature sensor 142, a cam position or a rotational position of a cam shaft, which opens and closes the intake valve 128 and an exhaust valve for gas intake and exhaust into and from the combustion chamber, from a cam position sensor 144, a throttle position or a position of the throttle valve 124 from a throttle valve position sensor 146, and an air intake flow as a load of the engine 22 from a vacuum sensor (not shown). The engine ECU 24 outputs diversity of drive signals and control signals to drive and control the engine 22 via its output port (not shown). For example, the engine ECU 24 outputs, via its output port, drive signals to the fuel injection valve 126 and to a throttle motor 136 for regulating the position of the throttle valve 124 and control signals to an ignition coil 138 integrated with an igniter and to a variable valve timing mechanism 150 for varying the open and close timings of the intake valve 128. The engine ECU 24 establishes communication with the hybrid electronic control unit 70 and receives control signals from the hybrid electronic control unit 70 to drive and control the engine 22, while outputting data regarding the driving conditions of the engine 22 to the hybrid electronic control unit 70 according to the requirements.

The power distribution integration mechanism 30 includes a sun gear 31 as an external gear, a ring gear 32 as an internal gear arranged concentrically with the sun gear 31, multiple pinion gear 33 engaging with the sun gear 31 and with the ring gear 32, and a carrier 34 holding the multiple pinion gears 33 to allow both their revolutions and their rotations on their axes. The power distribution integration mechanism 30 is thus constructed as a planetary gear mechanism including the sun gear 31, the ring gear 32, and the carrier 34 as rotational elements of differential motions. The carrier 34, the sun gear 31, and the ring gear 32 of the power distribution integration mechanism 30 are respectively linked to the crankshaft 26 of the engine 22, to the motor MG1, and to the reduction gear 35 via the ring gear shaft 32a. When the motor MG1 functions as a generator, the power of the engine 22 input through the carrier 34 is distributed into the sun gear 31 and the ring gear 32 corresponding to their gear ratio. When the motor MG1 functions as a motor, on the other hand, the power of the engine 22 input through the carrier 34 is integrated with the power of the motor MG1 input through the sun gear 31 and is output to the ring gear 32. The power output to the ring gear 32 is transmitted through the ring gear shaft 32a and is eventually given to drive wheels 63a and 63b of the hybrid vehicle 20 via a gear mechanism 60 and a differential gear 62.

The motors MG1 and MG2 are constructed as known synchronous motor generators that may be actuated both as a generator and as a motor. The motors MG1 and MG2 transmit electric powers to and from a battery 50 via inverters 41 and 42. Power lines 54 connecting the battery 50 with the inverters 41 and 42 are structured as common positive bus and negative bus shared by the inverters 41 and 42. Such connection enables electric power generated by one of the motors MG1 and MG2 to be consumed by the other motor MG2 or MG1. The battery 50 may thus be charged with surplus electric power generated by either of the motors MG1 and MG2, while being discharged to supplement insufficient electric power. The battery 50 is neither charged nor discharged, while the input and output of electric powers are balanced between the motors MG1 and MG2. Both the motors MG1 and MG2 are driven and controlled by a motor electronic control unit (hereafter referred to as motor ECU 40. The motor ECU 40 inputs signals required for driving and controlling the motors MG1 and MG2, for example, signals representing rotational positions of rotors in the motors MG1 and MG2 from rotational position detection sensors 43 and 44 and signals representing phase currents to be applied to the motors MG1 and MG2 from electric current sensors (not shown). The motor ECU 40 outputs switching control signals to the inverters 41 and 42. The motor ECU 40 establishes communication with the hybrid electronic control unit 70 and receives control signals from the hybrid electronic control unit 70 to drive and control the motors MG1 and MG2, while outputting data regarding the driving conditions of the motors MG1 and MG2 to the hybrid electronic control unit 70 according to the requirements.

The battery 50 is under control of a battery electronic control unit (hereafter referred to as battery ECU) 52. The batter ECU 52 inputs signals required for management of the battery 50, for example, an inter-terminal voltage from a voltage sensor (not shown) located between terminals of the battery 50, a charge-discharge electric current from an electric current sensor (not shown) located in the power line 54 connecting with an output terminal of the battery 50, and a battery temperature Tb from a temperature sensor 51 attached to the battery 50. The battery ECU 52 outputs data regarding the conditions of the battery 50 to the hybrid electronic control unit 70 by communication according to the requirements. For management of the battery 50, the battery ECU 52 computes a remaining charge level or current state of charge (SOC) of the battery 50 from an integration of the charge-discharge electric current measured by the electric current sensor (not shown).

The hybrid electronic control unit 70 is constructed as a microprocessor including a CPU 72, a ROM 74 that stores processing programs, a RAM 76 that temporarily stores data, input and output ports (not shown), and a communication port (not shown). The hybrid electronic control unit 70 receives, via its input port, an ignition signal from an ignition switch 80, a gearshift position SP or a current setting position of a gearshift lever 81 from a gearshift position sensor 82, an accelerator opening Acc or the driver's depression amount of an accelerator pedal 83 from an accelerator pedal position sensor 84, a brake pedal position BP or the driver's depression amount of a brake pedal 85 from a brake pedal position sensor 86, and a vehicle speed V from a vehicle speed sensor 88. The hybrid electronic control unit 70 establishes communication with the engine ECU 24, the motor ECU 40, and the battery ECU 52 via its communication port to receive and send the diversity of control signals and data from and to the engine ECU 24, the motor ECU 40, and the battery ECU 52, as mentioned above.

The hybrid vehicle 20 of the embodiment having the above construction sets a torque demand to be output to the ring gear shaft 32a or the drive shaft corresponding to the given vehicle speed V and the given accelerator opening Acc (the driver's depression amount of the accelerator pedal 83), and drives and controls the engine 22 and the motors MG1 and MG2 to ensure output of a power demand equivalent to the preset torque demand to the ring gear shaft 32a. There are several drive control modes of the engine 22 and the motors MG1 and MG2. In a torque conversion drive mode, while the engine 22 is driven and controlled to output a required level of power corresponding to the power demand, the motors MG1 and MG2 are driven and controlled to enable all the output power of the engine 22 to be subjected to torque conversion by the power distribution integration mechanism 30 and the motors MG1 and MG2 and to be output to the ring gear shaft 32a. In a charge-discharge drive mode, the engine 22 is driven and controlled to output a required level of power corresponding to the sum of the power demand and electric power used to charge the battery 50 or discharged from the battery 50. The motors MG1 and MG2 are driven and controlled to enable all or part of the output power of the engine 22, which is equivalent to the power demand with charge or discharge of the battery 50, to be subjected to torque conversion by the power distribution integration mechanism 30 and the motors MG1 and MG2 and to be output to the ring gear shaft 32a. In a motor drive mode, the motor MG2 is driven and controlled to ensure output of a required level of power corresponding to the power demand to the ring gear shaft 32a, while the engine 22 is at a stop.

Figure 3:
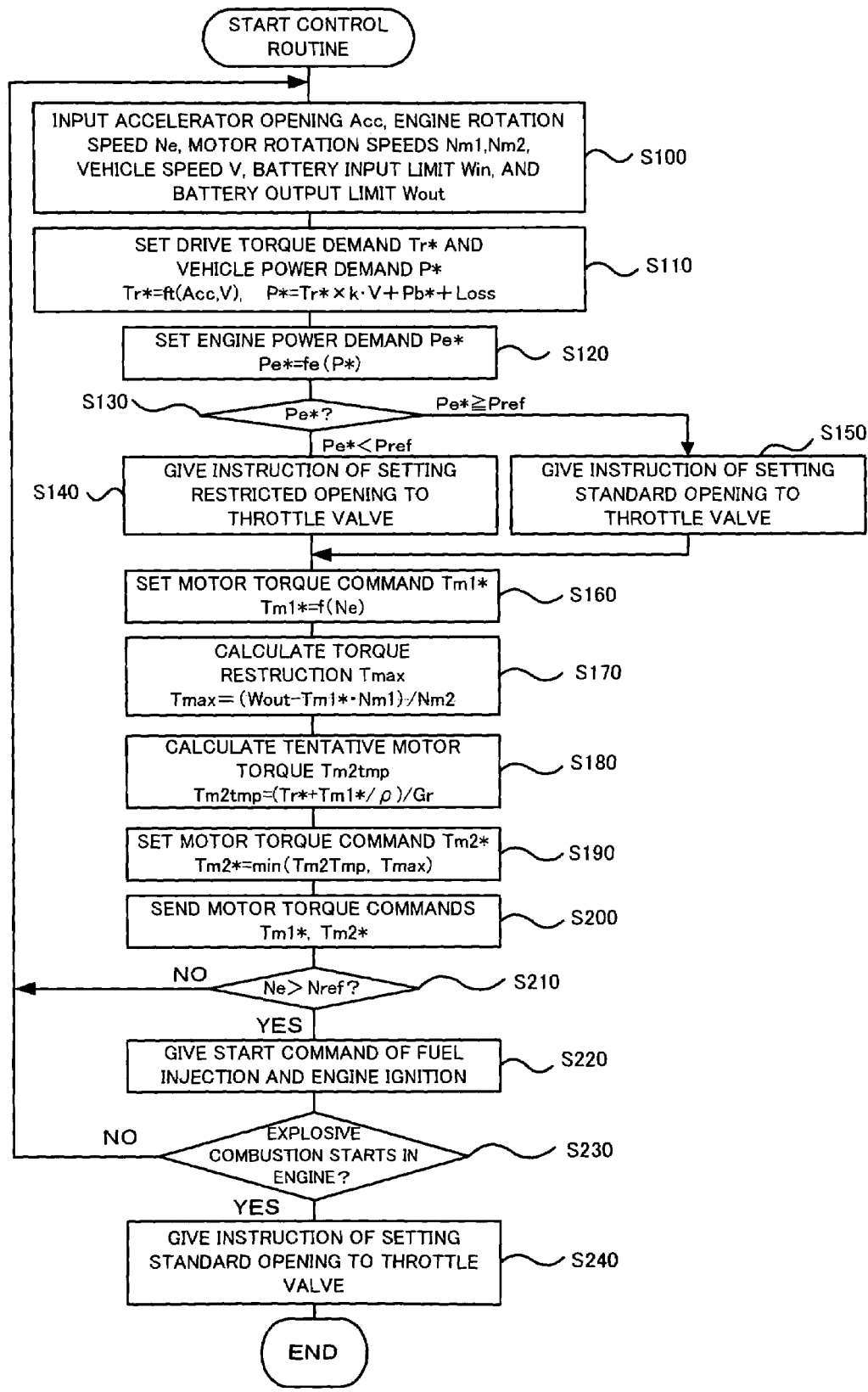
FIG. 3 is a flowchart showing a start control routine executed by a hybrid electronic control unit in the embodiment.

The description now regards the operations of the hybrid vehicle 20 of the embodiment constructed as discussed above, especially a series of control at a start of the engine 22. FIG. 3 is a flowchart showing a start control routine executed by the hybrid electronic control unit 70. This start control routine is triggered by satisfaction of one of preset start conditions, for example, in response to a decrease in current state of charge (SOC) of the battery 50 below a preset level or in response to an increase in power demand to or above a preset level by the driver's depression of the accelerator pedal 83.

In the start control routine, the CPU 72 of the hybrid electronic control unit 70 first inputs various data required for control, that is, the accelerator opening Acc from the accelerator pedal position sensor 84, the vehicle speed V from the vehicle speed sensor 88, rotation speeds Nm1 and Nm2 of the motors MG1 and MG2, a rotation speed Ne of the engine 22, an input limit Win, and an output limit Wout of the battery 50 (step S100). The rotation speed Ne of the engine 22 is computed from the crank position detected by the crank position sensor 140 attached to the crankshaft 26 and is received from the engine ECU 24 by communication. The rotation speeds Nm1 and Nm2 of the motors MG1 and MG2 are computed from the rotational positions of the rotors in the motors MG1 and MG2 detected by the rotational position detection sensors 43 and 44 and are received from the motor ECU 40 by communication. The temperature Tb of the battery 50 is measured by the temperature sensor 51 attached to the battery 50 and is received from the battery ECU 52 by communication. The input limit Win and the output limit Wout of the battery 50 are set based on the temperature Tb of the battery 50 measured by the temperature sensor 51 and the measured current state of charge (SOC) of the battery 50 and are received from the battery ECU 52 by communication.

Figure 4:
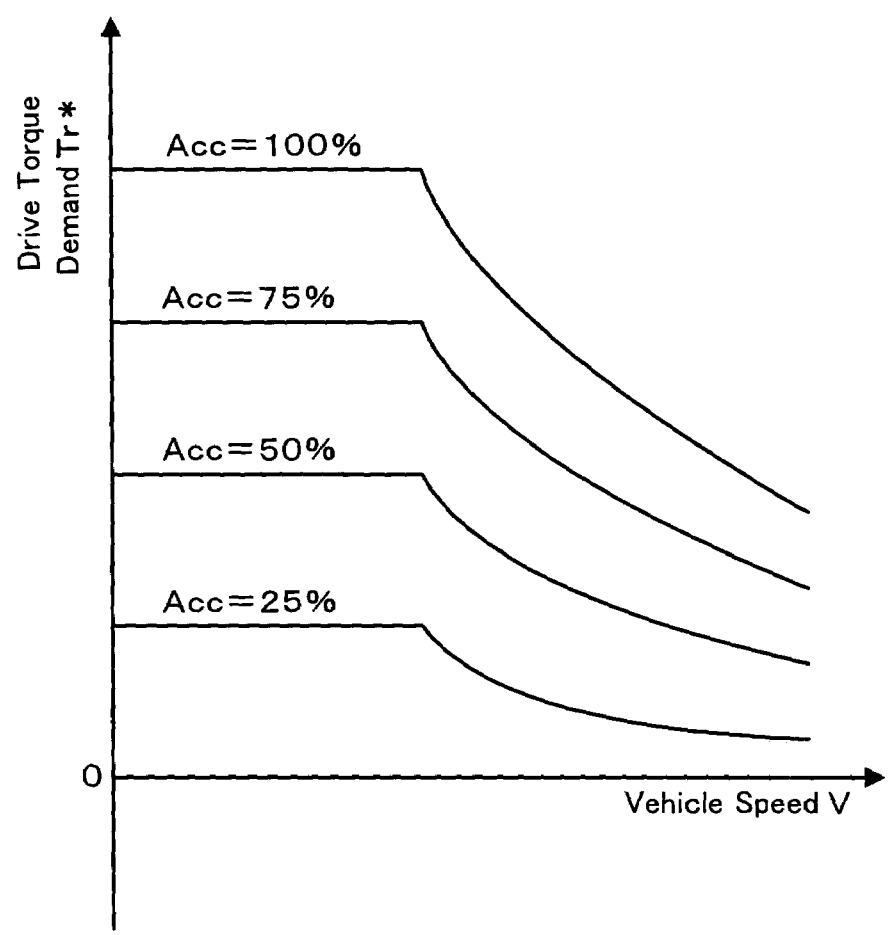
FIG. 4 shows a drive torque demand setting map.

After the data input, the CPU 72 sets a drive torque demand Tr* to be output to the drive shaft or the ring gear shaft 32a and a vehicle power demand P* required to drive the hybrid vehicle 20, based on the input accelerator opening Acc and the input vehicle speed V (step S110). A concrete procedure of setting the drive torque demand Tr* in this embodiment stores in advance variations in drive torque demand Tr* against the accelerator opening Acc and the vehicle speed V as a drive torque demand setting map in the ROM 74 and reads the drive torque demand Tr* corresponding to the given accelerator opening Acc and the given vehicle speed V from the map. One example of the drive torque demand setting map is shown in FIG. 4. The vehicle power demand P* is calculated as the sum of the product of the drive torque demand Tr* and a rotation speed Nr of the ring gear shaft 32a or the drive shaft, a charge-discharge power demand Pb* of the battery 50, and a potential loss. The rotation speed Nr of the ring gear shaft 32a is obtained by multiplying the vehicle speed V by a conversion coefficient k.

After setting the drive torque demand Tr* and the vehicle power demand P*, an engine power demand Pe* to be output from the engine 22 is set based on the vehicle power demand P* (step S120). The engine power demand Pe* represents a required power to be output from the engine 22 immediately after a start of the engine 22.

The engine power demand Pe* is then compared with a preset threshold value Pref (step S130). The threshold value Pref is set as a required power for sudden acceleration of the hybrid vehicle 20 and depends upon the performance of the engine 22 and the total weight of the hybrid vehicle 20 equipped with the engine 22. When the engine power demand Pe* is less than the preset threshold value Pref, the CPU 72 gives an instruction of setting a restricted opening to the throttle valve 124 (step S140) to reduce the air intake flow. When the engine power demand Pe* is not less than the preset threshold value Pref, on the other hand, the CPU 72 gives an instruction of setting a standard opening to the throttle valve 124 (step S150) to regulate the air intake flow corresponding to the engine power demand Pe*. The restricted opening gives a reduced air intake flow to ensure a quiet start of the engine 22 with control of potential vibration induced by ignition of the engine 22. The standard opening gives a normal air intake flow to ensure output of a required level of driving force equivalent to the engine power demand Pe*, which is set based on the vehicle power demand P*, from the engine 22. The selective setting of the opening of the throttle valve 124 ensures a quiet start of the engine 22 under the condition of the engine power demand Pe* of less than the preset threshold value Pref, while ensuring a prompt output of the required driving force from the engine 22 under the condition of the engine power demand Pe* of not less than the preset threshold value Pref.

Figure 5:
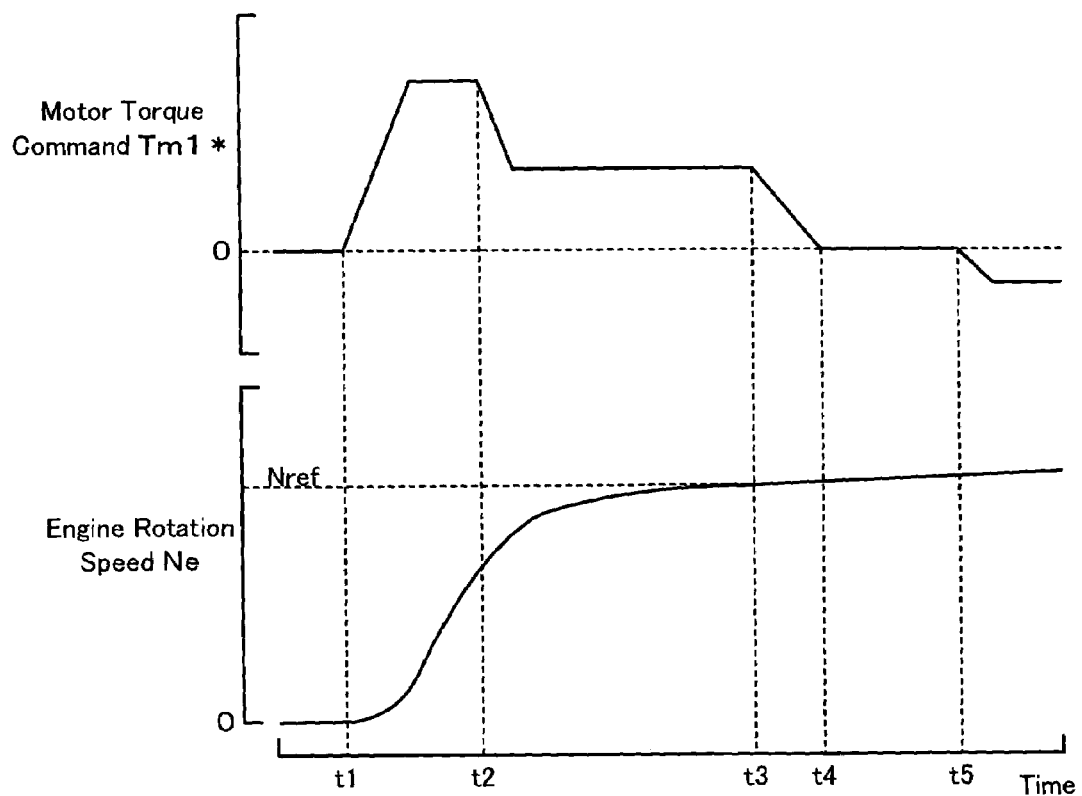
FIG. 5 shows variations in torque command Tm1* of a motor MG1 and in rotation speed Ne of the engine with time at a start of the engine.
Figure 6:
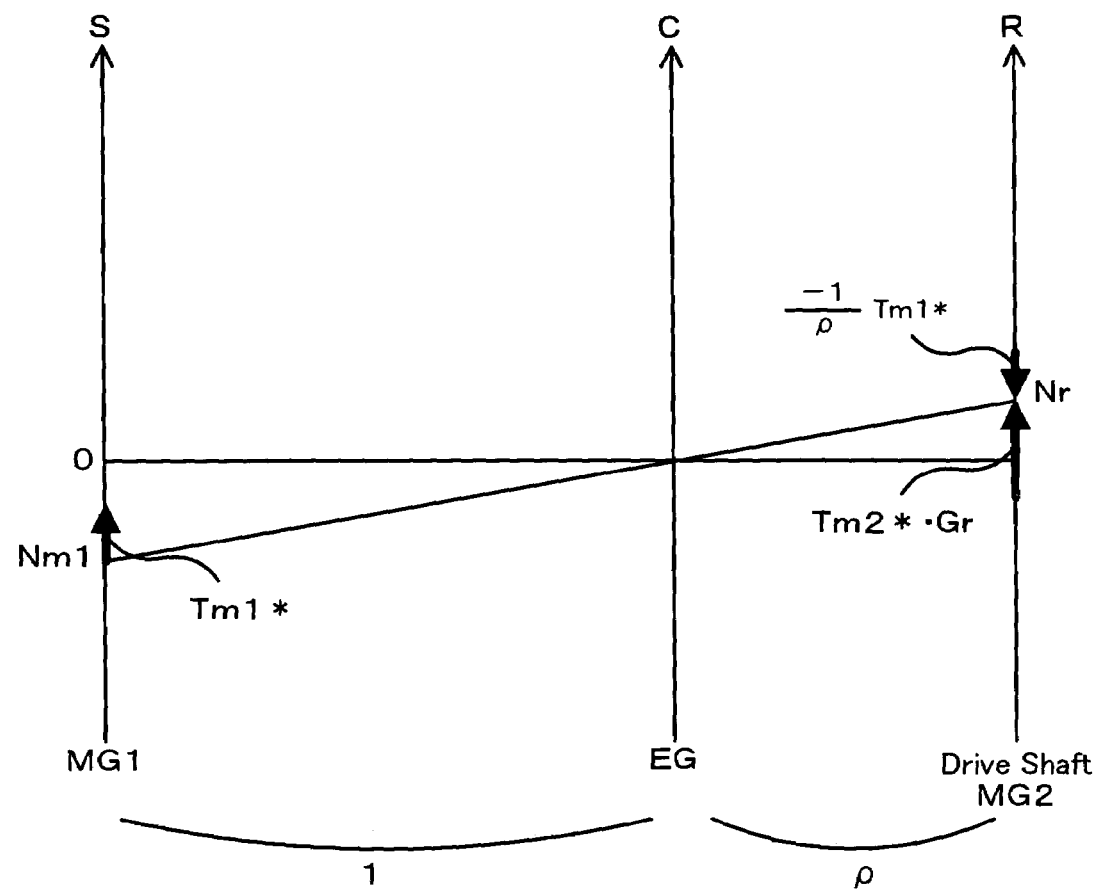
FIG. 6 is an alignment chart showing a dynamic relation of rotational elements included in a power distribution integration mechanism at a start of the engine.

The CPU 72 subsequently sets a torque command Tm1* of the motor MG1 corresponding to the input rotation speed Ne of the engine 22 (step S160). Variations in torque command Tm1* of the motor MG1 and in rotation speed Ne of the engine 22 with time are shown in FIG. 5. The control procedure sets a relatively high torque to the torque command Tm1* of the motor MG1 by the rating process and promptly raises the rotation speed Ne of the engine 22 immediately after a time t1 when a start command of the engine 22 is given. After a time t2 when the rotation speed Ne of the engine 22 passes through a resonance rotation speed range, the torque command Tm1* is adjusted to a certain torque level that ensures stable motoring of the engine 22 to raise the rotation speed Ne to a reference value Nref. Such setting saves the power consumption and lowers the level of reactive force applied on the ring gear shaft 32a or the drive shaft. The torque command Tm1* starts decreasing to 0 by the rating process at a time t3 when the rotation speed Ne of the engine 22 reaches the reference value Nref. The torque command Tm1* is then set to a certain torque level for power generation after a time t5 when a start of explosive combustion in the engine 22 is detected. A sufficiently high torque is set to the torque command Tm1* immediately after output of the start command of the engine 22. The alignment chart of FIG. 6 shows a dynamic relation of the rotation elements included in the power distribution integration mechanism 30 in this state. The left axis 'S' represents the rotation speed of the sun gear 31 that is equivalent to the rotation speed Nm1 of the motor MG1. The middle axis 'C' represents the rotation speed of the carrier 34 that is equivalent to the rotation speed Ne of the engine 22. The right axis 'R' represents the rotation speed Nr of the ring gear 32, which is obtained by multiplying the rotation speed Nm2 of the motor MG2 by a gear ratio Gr of the reduction gear 35.

After setting the torque command Tm1* of the motor MG1, the CPU 72 subsequently calculates a torque restriction Tmax as a maximum torque output from the motor MG2 according to Equation (1) given below (step S170):

$$Tmax=(Wout-Tm1^*\cdot Nm1)/Nm2 \quad (1)$$

The torque restriction Tmax is given by dividing a difference between the output limit Wout of the battery 50 and power consumption (power generation) of the motor MG1, which is the product of the torque command Tm1* and the input current rotation speed Nm1 of the motor MG1, by the input current rotation speed Nm2 of the motor MG2. The CPU 72 then calculates a tentative motor torque Tm2tmp to be output from the motor MG2 from the drive torque demand Tr*, the torque command Tm1* of the motor MG1, a gear ratio p of the power distribution integration mechanism 30, and the gear ratio Gr of the reduction gear 35 according to Equation (2) given below (step S180):

$$Tm2tmp=(Tr^*+Tm1^*/\rho)/Gr \quad (2)$$

The CPU 72 compares the calculated torque restriction Tmax with the calculated tentative motor torque Tm2tmp and sets the smaller to a torque command Tm2* of the motor MG2 (step S190). Setting the smaller to the torque command Tm2* of the motor MG2 restricts the drive torque demand Tr* to be output to the ring gear shaft 32a or the drive shaft within the range of output restriction of the battery 50. Equation (2) is readily introduced from the alignment chart of FIG. 6.

The torque commands Tm1* and Tm2* of the motors MG1 and MG2 are sent to the motor ECU 40 (step S200). The motor ECU 40 receives the torque commands Tm1* and Tm2* and executes switching control of the switching elements included in the inverters 41 and 42 to drive the motor MG1 with the torque command Tm1* and drive the motor MG2 with the torque command Tm2*.

The rotation speed Ne of the engine 22 is then compared with the reference value Nref (step S210). The reference value Nref represents a rotation speed of the engine 22 to start fuel injection control and ignition control and is set equal to, for example, 800 rpm or 1000 rpm. When the rotation speed Ne of the engine 22 does not exceed the reference value Nref at step S210, the processing of steps S100 to S200 discussed above is repeatedly executed. When the rotation speed Ne of the engine 22 exceeds the reference value Nref at step S210, the CPU 72 gives a start instruction of fuel injection control and ignition control (step S220). This start instruction is given only once and is not given in a repeated manner. The processing of steps S100 to S210 is repeated until detection of a start of explosive combustion in the engine 22 (step S230). In response to detection of a start of explosive combustion in the engine 22, the CPU 72 gives the instruction of setting the standard opening to the throttle valve 124 (step S240) and exits from the start control routine. On completion of this start control routine, a drive control routine (not shown) is executed to drive the hybrid vehicle 20 with the powers of the engine 22 and the motors MG1 and MG2.

As described above, the hybrid vehicle 20 of the embodiment basically starts the engine 22 under the condition of the restricted opening of the throttle valve 124. This effectively dampens potential vibration induced by ignition at a start of the engine 22. When the driver stamps on the accelerator pedal 83 at a start of the engine 22 to raise the engine power demand Pe* to or above the threshold value Pref, the control procedure regulates the throttle valve 124 to the standard opening. This ensures prompt output of the driver's required power at the start of the engine 22.

The hybrid vehicle 20 of the embodiment sets the threshold value Pref as the required power for sudden acceleration of the vehicle. The threshold value Pref is, however, not restricted to such setting but may be set as a power greater than the required power for sudden acceleration of the vehicle or as a power smaller than the required power for sudden acceleration of the vehicle. The control procedure of the embodiment regulates the throttle valve 124 to the standard opening to ensure the air intake flow corresponding to the engine power demand Pe*, when the engine power demand Pe* is not less than the threshold value Pref. One modified procedure may regulate the throttle valve 124 to a preset opening greater than the restricted opening but smaller than the standard opening. Another modified procedure may set the opening of the throttle valve 124 to a fixed value to ensure a fixed intake air flow regardless of a variation in engine power demand Pe*.

The hybrid vehicle 20 of the embodiment regulates the opening of the throttle valve 124 at a start of cranking. The throttle valve 124 may be regulated immediately before a start of fuel injection control and ignition control. Namely regulation of the throttle valve 124 may be synchronized with a start of fuel injection control and ignition control. This modification regulates the opening of the throttle valve 124 only immediately before ignition at a start of the engine 22 and thereby saves the duplicated regulation of the throttle valve 124.

The embodiment regards the hybrid vehicle 20 equipped with the auto start-stop device for the internal combustion engine of the invention. The auto start-stop device for the internal combustion engine may be mounted on any of diverse vehicles other than motor vehicles, for example, train cars, as well as on any of diverse moving objects including ships, boats, and aircraft. The auto start-stop device for the internal combustion engine may also be built in stationary equipment, such as construction machinery. The auto start-stop device for the internal combustion engine may also be mounted on motor vehicles without the motors MG1 and MG2 or their equivalency, for example, motor vehicles having an idling stop system. The principle of the invention is applicable to any system of making an auto stop and an auto start of the internal combustion engine.

The control procedure of the embodiment sets the power demand in response to the driver's depression of the accelerator pedal 83 and controls the engine 22 and the motors MG1 and MG2. The technique of the invention is also applicable to any operator-free systems that automatically set a power demand to be output, for example, automated trains and ships.

The embodiment discussed above is to be considered in all aspects as illustrative and not restrictive. There may be many modifications, changes, and alterations without departing from the scope or spirit of the main characteristics of the present invention. All changes within the meaning and range of equivalency of the claims are intended to be embraced therein.

What is claimed is:

1. An auto start-stop device for an internal combustion engine that outputs power to a drive shaft, said auto start-stop device automatically stopping the internal combustion engine under a preset stop condition, while restarting the automatically stopped internal combustion engine under a preset start condition, said auto start-stop device comprising:
    an air intake flow regulation module that regulates an air intake flow to the internal combustion engine;
    a power demand setting module that sets a power demand to be output from the internal combustion engine in response to an operator's operation; and
    a start-time air intake flow control module that controls said air intake flow regulation module under the preset start condition to start the internal combustion engine with a less air intake flow to the internal combustion engine when the set power demand is lower than a preset reference level, while controlling said air intake flow regulation module under the preset start condition to start the internal combustion engine with a greater air intake flow to the internal combustion engine when the set power demand is not lower than the preset reference level.

2. An auto start-stop device for the internal combustion engine in accordance with claim 1, wherein said start-time air intake flow control module controls said air intake flow regulation module to start the internal combustion engine with a varying air intake flow, which increases with an increase in power demand above the preset reference level.

3. An auto start-stop device for the internal combustion engine in accordance with claim 1, wherein said start-time air intake flow control module controls said air intake flow regulation module to regulate the air intake flow synchronously with a start of ignition control of the internal combustion engine.

4. An auto start-stop device for the internal combustion engine in accordance with claim 1, wherein said start-time air intake flow control module controls said air intake flow regulation module to regulate the air intake flow synchronously with a start of fuel injection control of the internal combustion engine.

5. A motor vehicle, comprising:
    an internal combustion engine that outputs power to a drive shaft linked with an axle;
    an auto start-stop module that automatically stops said internal combustion engine under a preset stop condition, while restarting said automatically stopped internal combustion engine under a preset start condition;

an air intake flow regulation module that regulates an air intake flow to said internal combustion engine;

a power demand setting module that sets a power demand to be output from said internal combustion engine in response to an operator's operation; and a start-time air intake flow control module that controls said air intake flow regulation module under the preset start condition to start said internal combustion engine with a less air intake flow to said internal combustion engine when the set power demand is lower than a preset reference level, while controlling said air intake flow regulation module under the preset start condition to start said internal combustion engine with a greater air intake flow to said internal combustion engine when the set power demand is not lower than the preset reference level.

6. A motor vehicle in accordance with claim 5, wherein said start-time air intake flow control module controls said air intake flow regulation module to start said internal combustion engine with a varying air intake flow, which increases with an increase in power demand above the preset reference level.

7. A motor vehicle in accordance with claim 5, wherein said start-time air intake flow control module controls said air intake flow regulation module to regulate the air intake flow synchronously with a start of ignition control of said internal combustion engine.

8. A motor vehicle in accordance with claim 5, wherein said start-time air intake flow control module controls said air intake flow regulation module to regulate the air intake flow synchronously with a start of fuel injection control of said internal combustion engine.

9. A motor vehicle in accordance with claim 5, said motor vehicle further comprising:

a motor that outputs power to the axle.

10. A motor vehicle in accordance with claim 9, said motor vehicle further comprising:

a driving force demand setting module that sets a driving force demand to be output to the drive shaft, in response to the operator's operation; and a driving force control module that controls said internal combustion engine and said motor to output a driving force equivalent to the driving force demand to the drive shaft.

* * * * *

UNITED STATES PATENT AND TRADEMARK OFFICE
CERTIFICATE OF CORRECTION

PATENT NO. : 7,150,254 B2
APPLICATION NO. : 11/108859
DATED : December 19, 2006
INVENTOR(S) : Kazuhiro Ichimoto et al.

It is certified that error appears in the above-identified patent and that said Letters Patent is hereby corrected as shown below:

| Column | Line | |
|---|---|---|
| 8 | 35 | Chagne Equation (1) to read as follows: |
| | | --$T\text{max}=(W\text{out}-Tml^* \cdot Nm1)/Nm2$--. |
| 8 | 45 | Change "gear ratio p" to --gear ratio $\rho$--. |

Signed and Sealed this

Seventeenth Day of April, 2007

JON W. DUDAS
*Director of the United States Patent and Trademark Office*